United States Patent
Foster et al.

(10) Patent No.: US 9,970,338 B2
(45) Date of Patent: May 15, 2018

(54) SYSTEM AND METHOD FOR IMPROVED GAS EXCHANGE IN CYLINDER DEACTIVATION APPLICATIONS

(71) Applicant: DELPHI TECHNOLOGIES IP LIMITED, St. Michael (BB)

(72) Inventors: Matthew G. Foster, Davison, MI (US); Keith A. Confer, Flushing, MI (US); Wayne R. Moore, Goodrich, MI (US)

(73) Assignee: DELPHI TECHNOLOGIES IP LIMITED (BB)

( * ) Notice: Subject to any disclaimer, the term of this patent is extended or adjusted under 35 U.S.C. 154(b) by 23 days.

(21) Appl. No.: 15/240,565

(22) Filed: Aug. 18, 2016

(65) Prior Publication Data
US 2018/0051601 A1 Feb. 22, 2018

(51) Int. Cl.
F01L 13/00 (2006.01)
F01L 1/08 (2006.01)
F02D 13/06 (2006.01)

(52) U.S. Cl.
CPC ............ F01L 13/0005 (2013.01); F01L 1/08 (2013.01); F02D 13/06 (2013.01); *F01L 13/0015* (2013.01); *F01L 13/0036* (2013.01); *F01L 2013/001* (2013.01)

(58) Field of Classification Search
CPC ............ F01L 2001/186; F01L 13/0005; F01L 2013/001; F01L 13/0015; F01L 13/0036; F01L 2810/05
USPC .................................. 123/90.16, 90.2, 90.44
See application file for complete search history.

(56) References Cited

U.S. PATENT DOCUMENTS

2006/0144356 A1* 7/2006 Sellnau .................. F01L 1/185
123/90.16

* cited by examiner

*Primary Examiner* — Jorge Leon, Jr.
(74) *Attorney, Agent, or Firm* — Joshua M. Haines

(57) ABSTRACT

A cylinder deactivation system includes an intake cam follower assembly, an exhaust cam follower assembly, an exhaust cam, and a controller. The intake cam follower assembly is used to open an intake engine valve and is switchable to operate in one of an active state and a deactive state. The exhaust cam follower assembly is used to open an exhaust engine valve and is switchable to operate in one of a primary lift state and a secondary lift state. The exhaust cam includes a primary lift cam lobe and a secondary lift cam lobe and is used to actuate the exhaust cam follower assembly in the primary lift state and in the secondary lift state. The controller is used to open the exhaust engine valve during the deactive combustion cycle in advance of the opening of the intake engine valve that occurs during the subsequent active combustion cycle.

22 Claims, 6 Drawing Sheets

SYSTEM AND METHOD FOR IMPROVED GAS EXCHANGE IN CYLINDER DEACTIVATION APPLICATIONS

TECHNICAL FIELD OF INVENTION

This disclosure generally relates to a multi-lift valvetrain system for internal combustion engines, and more particularly relates to a multi-lift valvetrain system for cylinder deactivation.

BACKGROUND OF INVENTION

It is known to deactivate a combustion event in one or more cylinders of an internal combustion engine to improve fuel economy by reducing throttle-associated pumping losses when the driver requested torque does not require the use of all engine cylinders. Cylinder deactivation strategies typically eliminate the opening of the intake valves and the exhaust valves in the deactivated cylinder and prevent gas exchange. Deactivation strategies must eventually fire a cylinder in which a combustion cycle was deactivated. For cam-driven valvetrains employing cylinder-deactivation strategies, gas exchange between the exhaust valves and intake valves is not possible if the exhaust valve is deactivated preceding the intake valve opening event. This causes cycle-to-cycle charge-air intake differences as the trapped combusted gas mass varies following a deactivated combustion cycle, compared to following a fired or activated combustion cycle, and renders utilizing internal residual management (i.e. valve overlap) difficult or impossible. Without the use of residual management strategies, opportunities for reducing fuel consumption (via de-throttling), reducing exhaust emissions (via dilution), and improving combustion stability (via heat addition) are eliminated. Additionally, the potential for opening an intake valve into a positively pressured engine cylinder exists when the exhaust valve is deactivated, which could lead to a catastrophic failure of the intake valve and manifold.

SUMMARY OF THE INVENTION

Described herein is a cylinder-deactivation system with improved gas exchange dynamics during the transition from a deactivated-combustion-cycle to an activated combustion-cycle through the use of a multi-lift valvetrain. The cylinder-deactivation system provides the opportunity for exhaust re-breathe into the cylinder, heat transfer back to the deactivated cylinder, internal residual management via cam phasing, and improved deactivation robustness by preventing the opening of an intake-engine-valve into a positive-pressured engine-cylinder.

In accordance with one embodiment, a cylinder-deactivation system is provided. The cylinder-deactivation system includes an intake cam-follower-assembly which opens an intake-engine-valve. The intake cam-follower-assembly is switchable to operate in one of an active-state that opens the intake-engine-valve and defines an active-combustion-cycle, and a deactive-state that prevents the opening of the intake-engine-valve and defines a deactive-combustion-cycle. The system also includes an exhaust cam-follower-assembly which opens an exhaust-engine-valve. The exhaust cam-follower-assembly is switchable to operate in one of a primary-lift-state, and a secondary-lift-state. The system also includes an exhaust-cam which includes a primary-lift cam-lobe and a secondary-lift cam-lobe in rotational contact with the exhaust cam-follower-assembly. The primary-lift cam-lobe is positioned to actuate the exhaust cam-follower-assembly in the primary-lift-state, and the secondary-lift cam-lobe is positioned to actuate the exhaust cam-follower-assembly in the secondary-lift-state. The system also includes a controller in communication with the intake cam-follower-assembly and the exhaust cam-follower-assembly. The controller is programmed to select the deactive-state. The controller is further programmed to select the secondary-lift-state such that the exhaust-engine-valve is opened with the secondary-lift cam-lobe during an exhaust-blow-down period of the deactive-combustion-cycle in advance of the opening of the intake-engine-valve that occurs during the subsequent active-combustion-cycle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
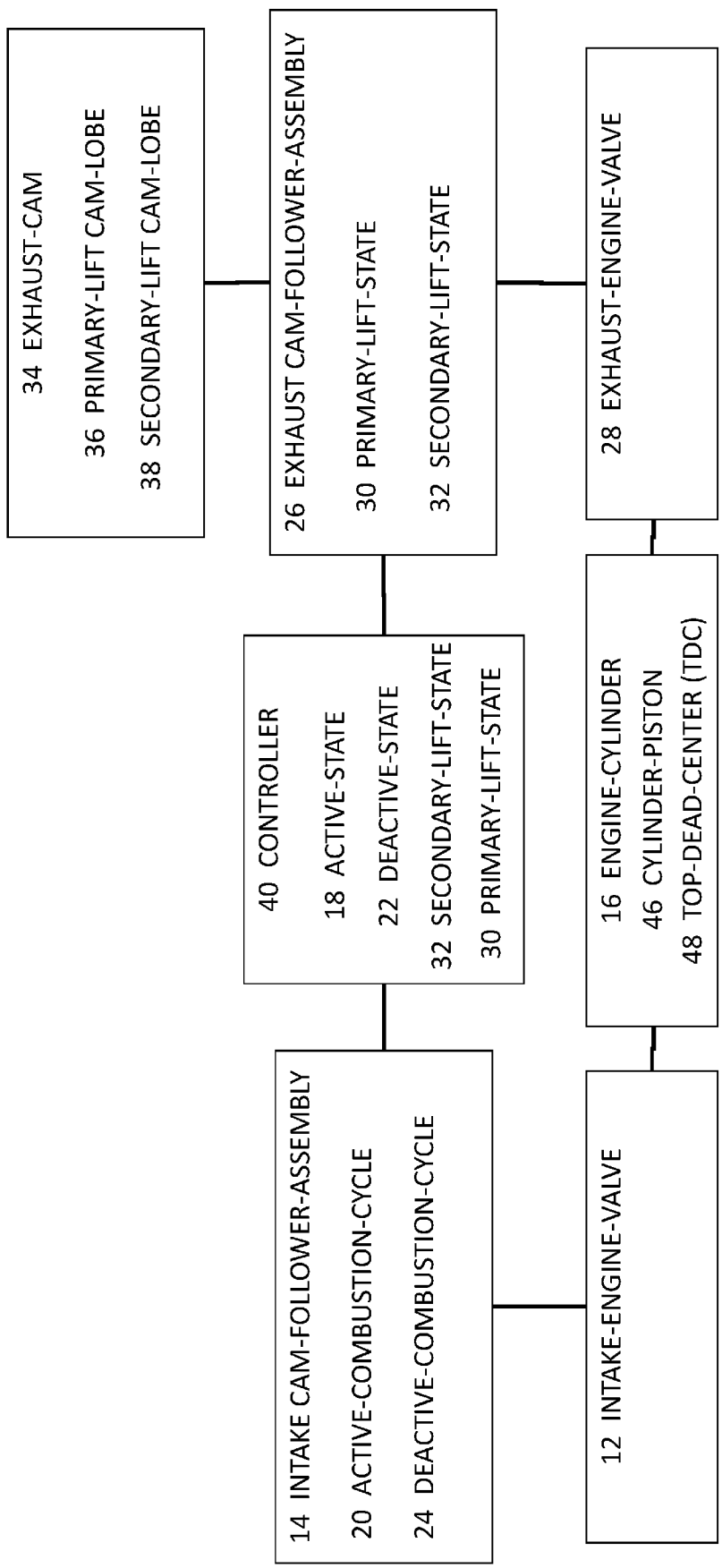
FIG. 1 is a block diagram of a cylinder-deactivation system in accordance with one embodiment.

FIG. 1 illustrates a non-limiting example of a cylinder-deactivation system 10, hereafter referred to as the system 10, suitable for use on an internal combustion engine and used to disable an activation of an intake-engine-valve 12. The intake-engine-valve 12 is in direct communication with an intake cam-follower-assembly 14 which opens the intake-engine-valve 12 into an engine-cylinder 16. The intake cam-follower-assembly 14 is switchable to operate in an active-state 18 that opens the intake-engine-valve 12 and allows air to enter the engine-cylinder 16 to be combusted with fuel (not shown). The event of opening the intake-engine-valve 12 defines an active-combustion-cycle 20 that will be understood by one skilled in the art of cylinder-deactivation. The intake cam-follower-assembly 14 is also switchable to operate in a deactive-state 22 that prevents the opening of the intake-engine-valve 12 thus preventing the induction of air into the engine-cylinder 16 and defines a deactive-combustion-cycle 24. The air inducted into the engine-cylinder 16 may be mixed with fuel, as is the case with port fuel-injection-systems, or may not be mixed with fuel, as is the case with direct fuel-injection-systems. An example of a multi-lift valvetrain capable of switching between the active-state 18 and the deactive-state 22 is sold by Delphi Automotive Systems of Troy, Mich., USA, and is marketed under the name 2-Step Valve Lift System. The Delphi 2-Step Valve Lift System uses an oil-control-valve (not shown) for hydraulic actuation of the assembly and a hydraulic-lash-adjuster 27 that acts as a pivot point for the assembly. As used herein, both the oil-control-valve and the hydraulic-lash-adjuster 27 are components of the intake cam-follower-assembly 14. Other design features are contemplated, but not shown, for the intake cam-follower-assembly 14, such as replacing rollers with skids and replacing skids with rollers, as will be recognized by one skilled in the art.

Figure 2:
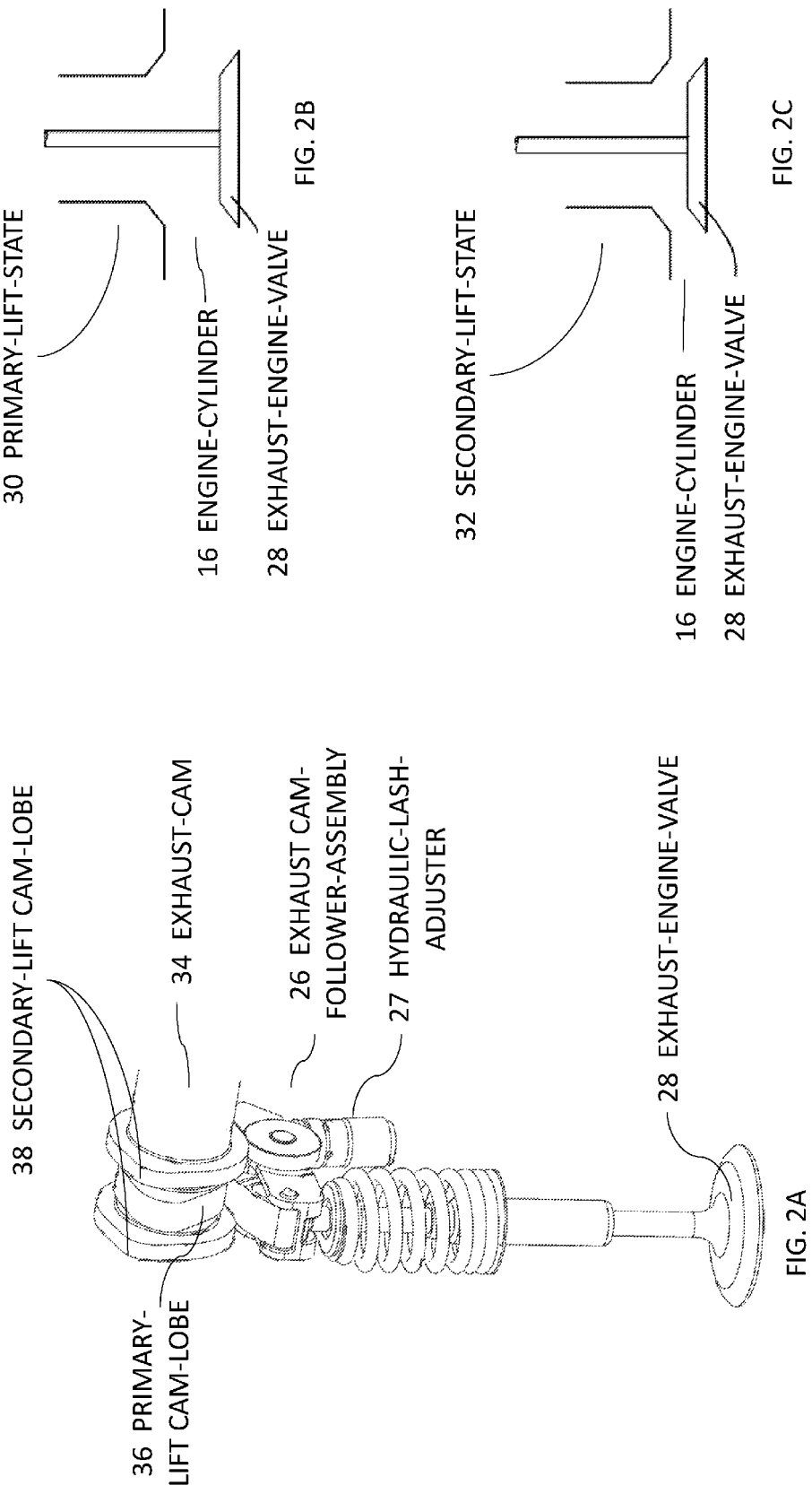
FIG. 2A is an illustration of an exhaust cam-follower-assembly of the system in FIG. 1 in accordance with one embodiment.
FIG. 2B is an illustration of a primary-lift-state of the exhaust cam-follower-assembly of FIG. 2A in accordance with one embodiment.
FIG. 2C is an illustration of a secondary-lift-state of the exhaust cam-follower-assembly of FIG. 2A in accordance with one embodiment.

The system 10 also includes an exhaust cam-follower-assembly 26, in direct communication with an exhaust-engine-valve 28, and is used to open the exhaust-engine-valve 28 as illustrated in FIG. 2A. The exhaust cam-follower-assembly 26 is switchable to operate in a primary-lift-state 30 and operate in a secondary-lift-state 32. The exhaust cam-follower-assembly 26 is also in direct communication with an exhaust-cam 34. The exhaust-cam 34 includes a primary-lift cam-lobe 36 that is in rotational contact with the exhaust cam-follower-assembly 26 and is positioned on the exhaust-cam 34 to actuate the exhaust cam-follower-assembly 26 in the primary-lift-state 30 and open the exhaust-engine-valve 28 to the designed displacement (FIG. 2B). The exhaust-cam 34 also includes a secondary-lift cam-lobe 38 proximate to the primary-lift cam-lobe 36 that is in rotational contact with the exhaust cam-follower-assembly 26 and is positioned on the exhaust-cam 34 to actuate to the exhaust cam-follower-assembly 26 in the secondary-lift-state 32 and open the exhaust-engine-valve 28 to the designed displacement (FIG. 2C), as will become evident with the further description of the figures. The relative displacements of the open exhaust-engine-valve 28 as illustrated in FIG. 2B and FIG. 2C is not meant to infer anything regarding relative displacements of the actual open exhaust-engine-valve 28, but are only shown to easier visualize the description presented below. An example of a multi-lift valvetrain capable of switching between the primary-lift-state 30 and the secondary-lift-state 32 is sold by Delphi Automotive Systems of Troy, Mich., USA, and is marketed under the name 2-Step Valve Lift System. The Delphi 2-Step Valve Lift System uses an oil-control-valve (not shown) for hydraulic actuation of the assembly and a hydraulic-lash-adjuster 27 that acts as a pivot point for the assembly. As used herein, both the oil-control-valve and the hydraulic-lash-adjuster 27 are components of the exhaust cam-follower-assembly 26. Other design features are contemplated, but not shown, for the exhaust cam-follower-assembly 26, such as replacing rollers with skids and replacing skids with rollers, as will be recognized by one skilled in the art.

The system 10 also includes a controller 40 that is programmed to select the deactive-combustion-cycle 24 according to a predefined set of engine operating conditions and engine calibration thresholds, as will be understood by one skilled in the art of engine calibration for cylinder-deactivation. The controller 40 is in electrical communication with the oil-control-valve of the intake cam-follower-assembly 14 and in electrical communication with the oil-control-valve of the exhaust cam-follower-assembly 26, and is programmed to select the deactive-state 22 once the selection of the deactive-combustion-cycle 24 has occurred. In the non-limiting example described herein, the controller 40 actuates the oil control valve (not shown) which acts to hydraulically engage a latch-pin (not shown) internal to the intake cam-follower-assembly 14 and internal to the exhaust cam-follower-assembly 26, in this way the controller 40 is seen as being in communication with the intake cam-follower-assembly 14 and in communication with the exhaust cam-follower-assembly 26. Other methods of engaging the latch-pin that are contemplated, but not illustrated, such as electrical-driven motors or solenoids, will be recognized by those skilled in the art of cylinder-deactivation. When the latch-pin is engaged the intake cam-follower-assembly 14 is locked in the active-state 18 and will open the intake-engine-valve 12 to the maximum designed displacement. When the latch-pin is engaged the exhaust cam-follower-assembly 26 is locked in the primary-lift-state 30 and will open the exhaust-engine-valve 28 to the maximum designed displacement. Upon removal of the hydraulic pressure to the latch-pin by the controller 40, the latch-pin retracts through the force of a coil-spring (not shown) and the intake cam-follower-assembly 14 is placed in the deactive-state 22 and the exhaust cam-follower-assembly 26 is placed in the secondary-lift-state 32. The system 10 may be configured to have individual actuators (e.g. individual oil control valves) for the intake cam-follower-assembly 14 and for the exhaust cam-follower-assembly 26, permitting the independent latching of the intake cam-follower-assembly 14 and the exhaust cam-follower-assembly 26. The system 10 may also be configured with a common actuator (e.g. a shared oil control valve) for the intake cam-follower-assembly 14 and the exhaust cam-follower-assembly 26, whereby the hydraulic circuits of the intake cam-follower-assembly 14 and the exhaust cam-follower-assembly 26 are pressurized simultaneously and will lock the latch-pin at the first occurrence of a cam-lobe base-circle rotation over the assembly. The choice of individual or common actuators is based on cost and available space on the engine.

The controller 40 includes a processor (not shown) such as a microprocessor or other control circuitry such as analog and/or digital control circuitry including an application specific integrated circuit (ASIC) for processing data as should be evident to those in the art. The controller 40 may include a memory (not shown), including non-volatile memory, such as electrically erasable programmable read-only memory (EEPROM) for storing one or more routines, thresholds, and captured data. The one or more routines are executed by the processor to perform steps for operating the system 10 based on signals received by the controller 40 as described herein. The controller 40 may also be programmed to receive vehicle related data such as vehicle speed (not shown), and transmission gear (not shown), and to receive engine related data such as engine-speed (not shown), engine-load (not shown), and desired-torque (not shown), for example.

While the engine-cylinder 16 is operating in the deactive-combustion-cycle 24, the controller 40 is further programmed to select the secondary-lift-state 32 which causes the exhaust-engine-valve 28 to be opened with the secondary-lift cam-lobe 38 at a point in the combustion-cycle where an exhaust-blow-down period 42 of the deactivecombustion-cycle 24 occurs. As illustrated by a graph 44 in FIG. 3, the timing of the opening of the exhaust-engine-valve 28 during the exhaust-blow-down period 42 is in advance of the opening of the intake-engine-valve 12 that occurs during the subsequent active-combustion-cycle 20. This allows a portion of the combusted gasses in the exhaust manifold to be drawn into the engine-cylinder 16 when the intake-engine-valve 12 is opened, which is beneficial for reducing fuel consumption, reducing exhaust emissions, and improving combustion stability as will be recognized by one skilled in the art of internal combustion engines. Additionally, opening the exhaust-engine-valve 28 in advance of the opening of the intake-engine-valve 12 eliminates the potential for catastrophic failure of the intake-engine-valve 12 that may occur if the intake-engine-valve 12 opens into a positively pressured engine-cylinder 16. The exhaust-engine-valve 28 is opened before a cylinder-piston 46 of the engine-cylinder 16 reaches a top-dead-center 48 (TDC 48) position of the deactive-combustion-cycle 24. Preferably, the exhaust-engine-valve 28 is opened within ten degrees (10°) of a crankshaft-revolution 50 before the opening of the intake-engine-valve 12, and remains open for between 60° of the crankshaft-revolution 50 and 100° of the crankshaft-revolution 50. The timing and duration of the opening of the exhaust-engine-valve 28 may vary based on the engine's operating conditions and may be calibrated to suit the individual engine requirements as will be recognized by one skilled in the art.

Figure 4:
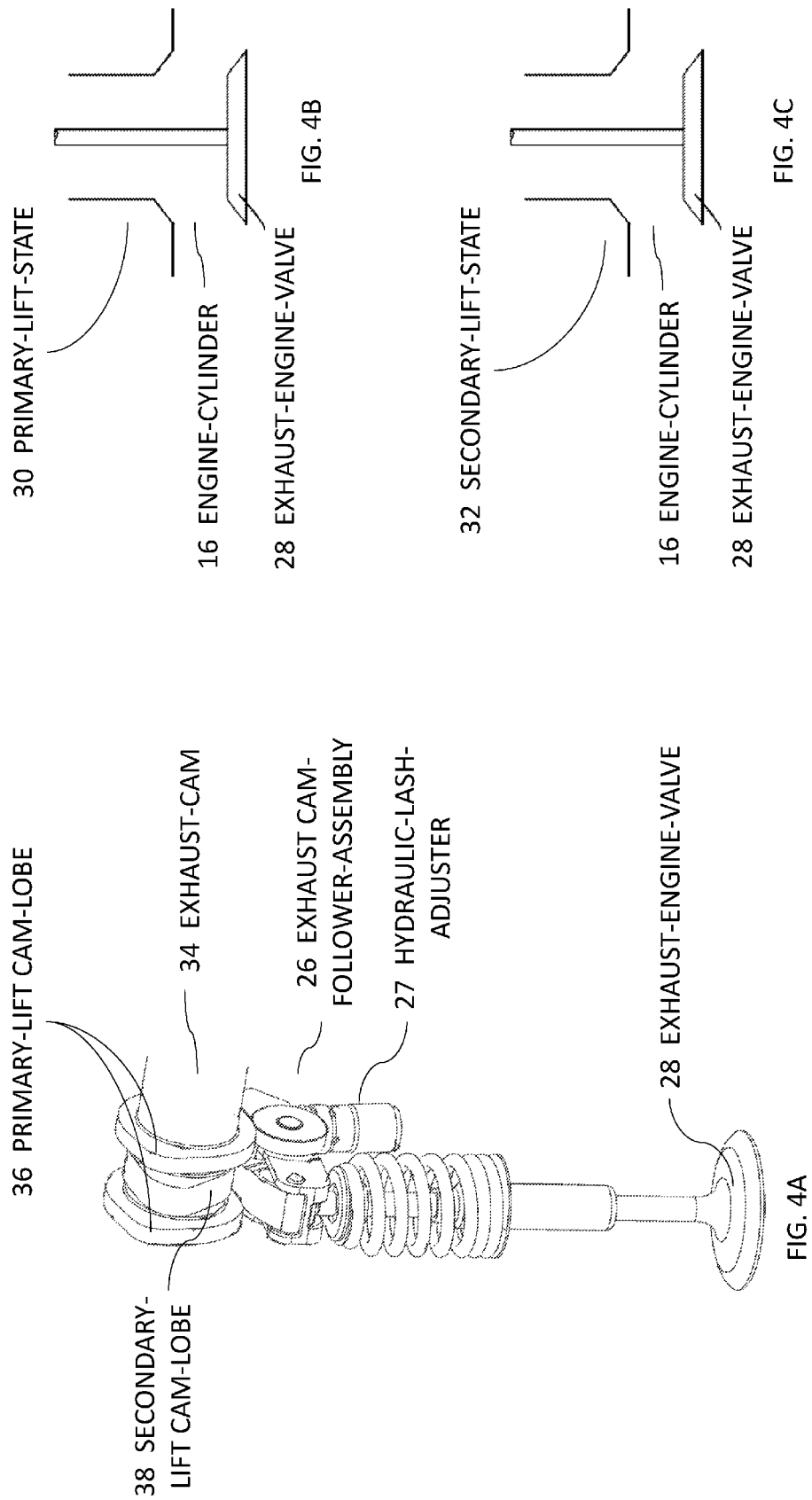
FIG. 4A is an illustration of an exhaust cam-follower-assembly of the system in FIG. 1 in accordance with one embodiment.
FIG. 4B is an illustration of a primary-lift-state of the exhaust cam-follower-assembly of FIG. 4A in accordance with one embodiment.
FIG. 4C is an illustration of a secondary-lift-state of the exhaust cam-follower-assembly of FIG. 4A in accordance with one embodiment.

FIG. 4A illustrates another embodiment of the system 10 where the secondary-lift cam-lobe 38 is designed to open the exhaust-engine-valve 28 for a longer duration compared to the embodiment shown in FIG. 2A. In this non-limiting example, the positions on the exhaust-cam 34 of the primary-lift cam-lobe 36 and secondary-lift cam-lobe 38 are switched to provide a longer duration for the opening of the exhaust-engine-valve 28 in the secondary-lift state 32. In addition, the profile design of the primary-lift cam-lobe 36 is modified to achieve the desired valve lift and duration, as will be recognized by one skilled in the art. The exhaust cam-follower-assembly 26 is switchable to operate in the primary-lift-state 30 and operate in the secondary-lift-state 32. The exhaust cam-follower-assembly 26 is also in direct communication with an exhaust-cam 34. The exhaust-cam 34 includes a primary-lift cam-lobe 36 that is in rotational contact with the exhaust cam-follower-assembly 26 and is positioned on the exhaust-cam 34 to actuate to the exhaust cam-follower-assembly 26 in the primary-lift-state 30 and open the exhaust-engine-valve 28 to the designed displacement (FIG. 4B). The exhaust-cam 34 also includes the secondary-lift cam-lobe 38 proximate to the primary-lift cam-lobe 36 that is in rotational contact with the exhaust cam-follower-assembly 26 and is positioned on the exhaust-cam 34 to actuate to the exhaust cam-follower-assembly 26 in the secondary-lift-state 32 and open the exhaust-engine-valve 28 to the designed displacement (FIG. 4C), as will become evident with the further description of the figures. The relative displacements of the open exhaust-engine-valve 28 as illustrated in FIG. 4B and FIG. 4C is not meant to infer anything regarding relative displacements of the actual open exhaust-engine-valve 28, but are only shown to easier visualize the description presented below.

Figure 5:
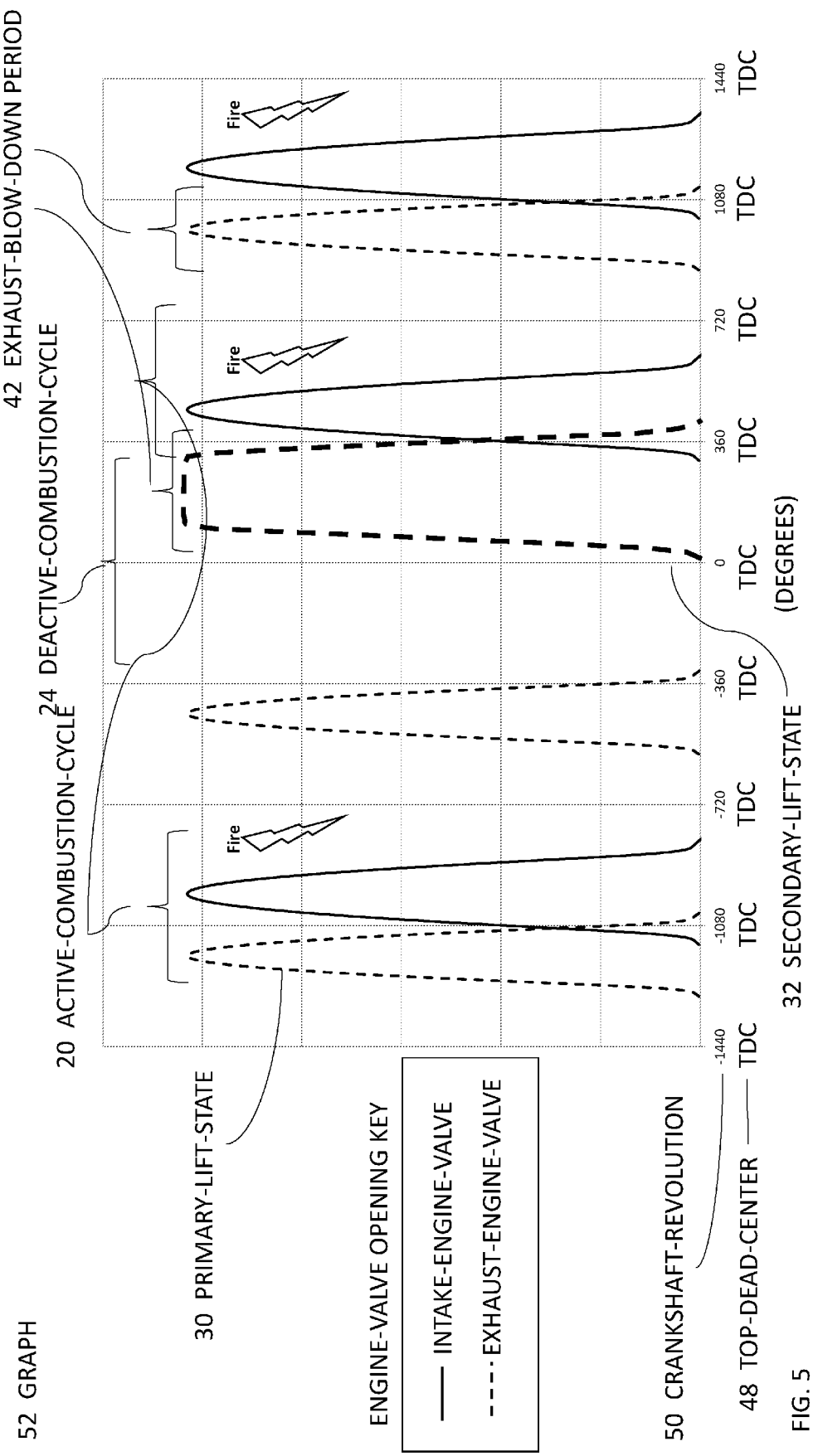
FIG. 5 is a graph of a timing of an opening of an exhaust-engine-valve using the exhaust cam-follower-assembly of FIG. 4A in accordance with one embodiment.

FIG. 5 is a graph 52 of the timing of the opening of the exhaust-engine-valve 28 of the embodiment of FIG. 4A. As illustrated by the graph 52, the timing of the opening of the exhaust-engine-valve 28 during the exhaust-blow-down period 42 is in advance of the opening of the intake-engine-valve 12 that occurs during the subsequent active-combustion-cycle 20. The exhaust-engine-valve 28 is opened when the cylinder-piston 46 of the engine-cylinder 16 is within 5° of the crankshaft-revolution 50 before TDC 48 and within 5° of the crankshaft-revolution 50 after TDC 48 of the deactive-combustion-cycle 24, and remains open for greater than 360° of the crankshaft-revolution 50. Preferably, the exhaust-engine-valve 28 is opened when the cylinder-piston 46 of the engine-cylinder 16 reaches the TDC 48 position of the deactive-combustion-cycle 24. This allows a portion of the combusted gasses in the exhaust manifold to be drawn into the engine-cylinder 16 when the intake-engine-valve 12 is opened, which is beneficial for reducing fuel consumption, reducing exhaust emissions, and improving combustion stability as will be recognized by one skilled in the art of internal combustion engines. Additionally, opening the exhaust-engine-valve 28 in advance of the opening of the intake-engine-valve 12 eliminates the potential for catastrophic failure of the intake-engine-valve 12 that may occur if the intake-engine-valve 12 opens into a positively pressured engine-cylinder 16.

One skilled in the art of internal combustion engines will recognize that the exhaust-cam 34 is in communication with the crankshaft (not shown) of the engine (not shown) through a timing-linkage such as a belt or a chain (not-shown). The timing-linkage ensures that the exhaust-engine-valve 28 is opened by the cam-shaft 34 at the appropriate point in the combustion-cycle that is dependent on the position of the cylinder-piston 46 in the engine-cylinder 16. Typically, the position of the cylinder-piston 46 in engine-cylinder 16 is referred to by the number of degrees of angular-rotation of the crankshaft (i.e. degrees of crankshaft-revolution 50) relative to the TDC 48 position, with TDC 48 being defined as 0° of the crankshaft-revolution 50, 360° of the crankshaft-revolution 50, and multiples of 360° of the crankshaft-revolution 50 thereof.

Figure 6:
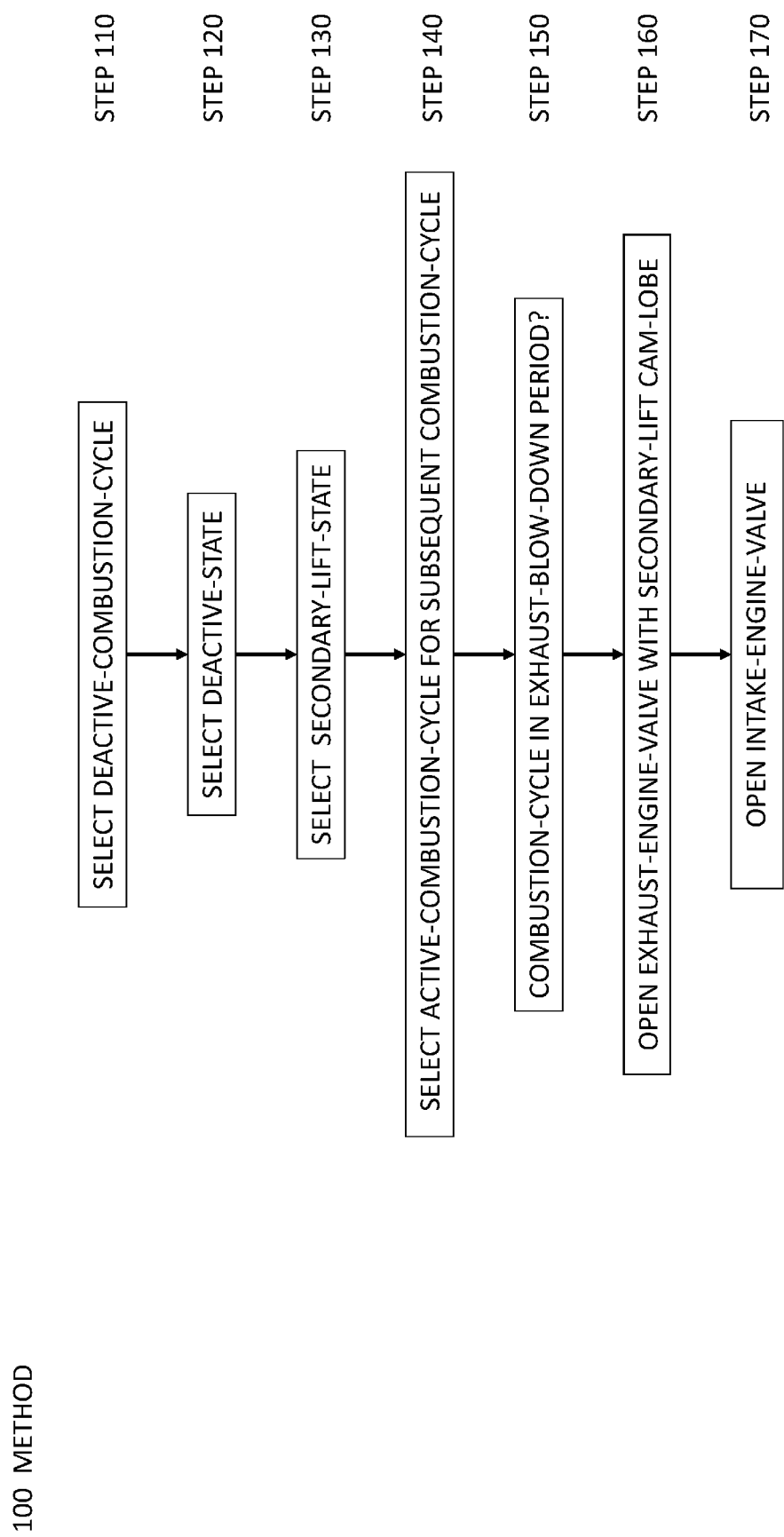
FIG. 6 is a flow chart of a method of using the cylinder-deactivation system of FIG. 1.

FIG. 6 illustrates a non-limiting example of a method 100 of operating the system 10 of FIG. 1.

Step 110, SELECT DEACTIVE-COMBUSTION-CYCLE, includes the selection by the controller 40 of the deactive-combustion-cycle 24 according to a predefined set of engine operating conditions and engine calibration thresholds, as will be understood by one skilled in the art of engine calibration for cylinder-deactivation.

Step 120, SELECT DEACTIVE-STATE, includes the selection by the controller 40 of the deactive-state 22 of the intake cam-follower-assembly 14 which prevents the opening of the intake-engine-valve 12 thus preventing the induction of air into the engine-cylinder 16 and defines a deactive-combustion-cycle 24. The controller 40 is in electrical communication with the oil-control-valve of the intake cam-follower-assembly 14 and in electrical communication with the oil-control-valve of the exhaust cam-follower-assembly 26, and is programmed to select the deactive-state 22 once the selection of the deactive-combustion-cycle 24 has occurred. In the non-limiting example described herein, the controller 40 actuates the oil control valve (not shown) which acts to hydraulically engage a latch-pin (not shown) internal to the intake cam-follower-assembly 14 and internal to the exhaust cam-follower-assembly 26, in this way the controller 40 is seen as being in communication with the intake cam-follower-assembly 14 and in communication with the exhaust cam-follower-assembly 26. Other methods of engaging the latch-pin that are contemplated, but not illustrated, such as electrical-driven motors or solenoids will be recognized by those skilled in the art of cylinder-deactivation. When the latch-pin is engaged the intake cam-follower-assembly 14 is locked in the active-state 18 and will open the intake-engine-valve 12 to the maximum designed displacement. When the latch-pin is engaged the exhaust cam-follower-assembly 26 is locked in the primary-lift-state 30 and will open the exhaust-engine-valve 28 to the maximum designed displacement. Upon removal of the hydraulic pressure to the latch-pin by the controller 40, the latch-pin retracts through the force of a coil-spring (not shown) and the intake cam-follower-assembly 14 is placed in the deactive-state 22 and the exhaust cam-follower-assembly 26 is placed in the secondary-lift-state 32. The system 10 may be configured to have individual actuators (e.g. individual oil control valves) for the intake cam-follower-assembly 14 and for the exhaust cam-follower-assembly 26, permitting the independent latching of the intake cam-follower-assembly 14 and the exhaust cam-follower-assembly 26. The system 10 may also be configured with a common actuator (e.g. a shared oil control valve) for the intake cam-follower-assembly 14 and the exhaust cam-follower-assembly 26, whereby the hydraulic circuits of the intake cam-follower-assembly 14 and the exhaust cam-follower-assembly 26 are pressurized simultaneously and will lock the latch-pin at the first occurrence of a cam-lobe base-circle rotation over the assembly. The choice of individual or common actuators is based on cost and available space on the engine.

Step 130, SELECT SECONDARY-LIFT-STATE, includes the selection by the controller 40 of the secondary-lift-state 32 of the exhaust cam-follower-assembly 26. The system 10 also includes an exhaust cam-follower-assembly 26, in direct communication with an exhaust-engine-valve 28, and is used to open the exhaust-engine-valve 28 as illustrated in FIG. 2A. The exhaust cam-follower-assembly 26 is switchable to operate in a primary-lift-state 30 and operate in a secondary-lift-state 32. The exhaust cam-follower-assembly 26 is also in direct communication with an exhaust-cam 34. The exhaust-cam 34 includes a primary-lift cam-lobe 36 that is in rotational contact with the exhaust cam-follower-assembly 26 and is positioned on the exhaust-cam 34 to actuate the exhaust cam-follower-assembly 26 in the primary-lift-state 30 and open the exhaust-engine-valve 28 to the designed displacement (FIG. 2B). The exhaust-cam 34 also includes a secondary-lift cam-lobe 38 proximate to the primary-lift cam-lobe 36 that is in rotational contact with the exhaust cam-follower-assembly 26 and is positioned on the exhaust-cam 34 to actuate to the exhaust cam-follower-assembly 26 in the secondary-lift-state 32 and open the exhaust-engine-valve 28 to the designed displacement (FIG. 2C), as will become evident with the further description of the figures. The relative displacements of the open exhaust-engine-valve 28 as illustrated in FIG. 2B and FIG. 2C is not meant to infer anything regarding relative displacements of the actual open exhaust-engine-valve 28, but are only shown to easier visualize the description presented below. An example of a multi-lift valvetrain capable of switching between the primary-lift-state 30 and the secondary-lift-state 32 is sold by Delphi Automotive Systems of Troy, Mich., USA, and is marketed under the name 2-Step Valve Lift System. The Delphi 2-Step Valve Lift System uses an oil-control-valve (not shown) for hydraulic actuation of the assembly and a hydraulic-lash-adjuster 27 that acts as a pivot point for the assembly. As used herein, both the oil-control-valve and the hydraulic-lash-adjuster 27 are components of the exhaust cam-follower-assembly 26. Other design features are contemplated, but not shown, for the exhaust cam-follower-assembly 26, such as replacing rollers with skids and replacing skids with rollers, as will be recognized by one skilled in the art.

FIG. 4A illustrates another embodiment of the system 10 where the secondary-lift cam-lobe 38 is designed to open the exhaust-engine-valve 28 for a longer duration compared to the embodiment shown in FIG. 2A. In this non-limiting example, the positions on the exhaust-cam 34 of the primary-lift cam-lobe 36 and secondary-lift cam-lobe 38 are switched to provide a longer duration for the opening of the exhaust-engine-valve 28 in the secondary-lift state 32. In addition, the profile design of the primary-lift cam-lobe 36 is modified to achieve the desired valve lift and duration, as will be recognized by one skilled in the art. The exhaust cam-follower-assembly 26 is switchable to operate in the primary-lift-state 30 and operate in the secondary-lift-state 32. The exhaust cam-follower-assembly 26 is also in direct communication with an exhaust-cam 34. The exhaust-cam 34 includes a primary-lift cam-lobe 36 that is in rotational contact with the exhaust cam-follower-assembly 26 and is positioned on the exhaust-cam 34 to actuate to the exhaust cam-follower-assembly 26 in the primary-lift-state 30 and open the exhaust-engine-valve 28 to the designed displacement (FIG. 4B). The exhaust-cam 34 also includes the secondary-lift cam-lobe 38 proximate to the primary-lift cam-lobe 36 that is in rotational contact with the exhaust cam-follower-assembly 26 and is positioned on the exhaust-cam 34 to actuate to the exhaust cam-follower-assembly 26 in the secondary-lift-state 32 and open the exhaust-engine-valve 28 to the designed displacement (FIG. 4C), as will become evident with the further description of the figures. The relative displacements of the open exhaust-engine-valve 28 as illustrated in FIG. 4B and FIG. 4C is not meant to infer anything regarding relative displacements of the actual open exhaust-engine-valve 28, but are only shown to easier visualize the description presented below.

Step 140, SELECT ACTIVE-COMBUSTION-CYCLE FOR SUBSEQUENT COMBUSTION-CYCLE, includes the selection by the controller 40 of the active-combustion-cycle 20 for the subsequent combustion-cycle of the deactive engine-cylinder 16.

Figure 3:
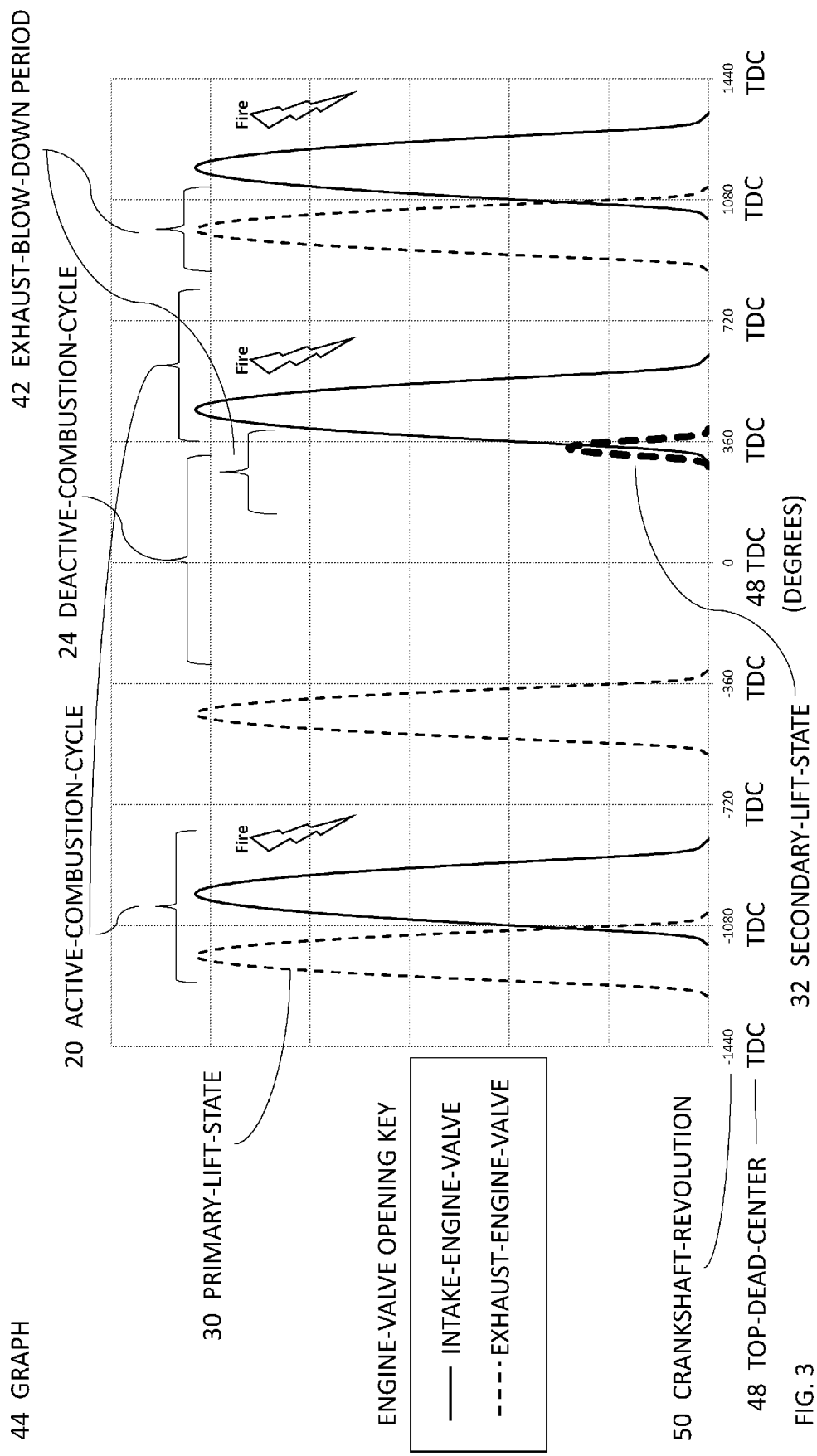
FIG. 3 is a graph of a timing of an opening of an exhaust-engine-valve using the exhaust cam-follower-assembly of FIG. 2A in accordance with one embodiment.

Step 150, COMBUSTION-CYCLE IN EXHAUST-BLOW-DOWN PERIOD?, includes determining by the controller 40 whether the combustion-cycle is in the exhaust-blow-down period 42 as illustrated in FIG. 3 and FIG. 5.

Step 160, OPEN EXHAUST-ENGINE-VALVE WITH SECONDARY-LIFT CAM-LOBE, includes the opening of the exhaust-engine-valve 28 through the actuation of the exhaust cam-follower-assembly 26 by the secondary-lift cam-lobe 38 of the exhaust-cam 34. In one embodiment of the system 10 illustrated in FIG. 2A, the timing of the opening of the exhaust-engine-valve 28 during the exhaust-blow-down period 42 is in advance of the opening of the intake-engine-valve 12 that occurs during the subsequent active-combustion-cycle 20, as illustrated by the graph 44 in FIG. 3. This allows a portion of the combusted gasses in the exhaust manifold to be drawn into the engine-cylinder 16 when the intake-engine-valve 12 is opened, which is beneficial for reducing fuel consumption, reducing exhaust emissions, and improving combustion stability as will be recognized by one skilled in the art of internal combustion engines. Additionally, opening the exhaust-engine-valve 28 in advance of the opening of the intake-engine-valve 12 eliminates the potential for catastrophic failure of the intake-engine-valve 12 that may occur if the intake-engine-valve 12 opens into a positively pressured engine-cylinder 16. The exhaust-engine-valve 28 is opened before a cylinder-piston 46 of the engine-cylinder 16 reaches a top-dead-center 48 (TDC 48) position of the deactive-combustion-cycle 24.

Preferably, the exhaust-engine-valve 28 is opened within ten degrees (10°) of a crankshaft-revolution 50 before the opening of the intake-engine-valve 12, and remains open for between 60° of the crankshaft-revolution 50 and 100° of the crankshaft-revolution 50. This allows a portion of the combusted gasses in the exhaust manifold to be drawn into the engine-cylinder 16 when the intake-engine-valve 12 is opened, which is beneficial for reducing fuel consumption, reducing exhaust emissions, and improving combustion stability as will be recognized by one skilled in the art of internal combustion engines. Additionally, opening the exhaust-engine-valve 28 in advance of the opening of the intake-engine-valve 12 eliminates the potential for catastrophic failure of the intake-engine-valve 12 that may occur if the intake-engine-valve 12 opens into a positively pressured engine-cylinder 16. The timing and duration of the opening of the exhaust-engine-valve 28 may vary based on the engine's operating conditions and may be calibrated to suit the individual engine requirements as will be recognized by one skilled in the art.

In another embodiment illustrated in FIG. 4A, the timing of the opening of the exhaust-engine-valve 28 is illustrated in the graph 52 of FIG. 5. As illustrated by the graph 52, the timing of the opening of the exhaust-engine-valve 28 during the exhaust-blow-down period 42 is in advance of the opening of the intake-engine-valve 12 that occurs during the subsequent active-combustion-cycle 20. The exhaust-engine-valve 28 is opened when the cylinder-piston 46 of the engine-cylinder 16 is within 5° of the crankshaft-revolution 50 before TDC 48 and within 5° of the crankshaft-revolution 50 after TDC 48 of the deactive-combustion-cycle 24, and remains open for greater than 360° of the crankshaft-revolution 50. Preferably, the exhaust-engine-valve 28 is opened when the cylinder-piston 46 of the engine-cylinder 16 reaches the TDC 48 position of the deactive-combustion-cycle 24.

Step 170, OPEN INTAKE-ENGINE-VALVE, includes the opening of the intake-engine-valve 12 through the activation of the intake cam-follower-assembly 14 as illustrated in FIG. 3 and in FIG. 5.

Accordingly, a cylinder-deactivation system 10, a controller 40 for the cylinder-deactivation system 10, and a method 100 for operating the system 10 is provided. The cylinder-deactivation system 10 allows improved gas exchange dynamics during the transition from the deactive-combustion-cycle 24 to the active-combustion-cycle 20 through the use of the multi-lift valvetrain. The system 10 provides the opportunity for exhaust re-breathe into the engine-cylinder 16, heat transfer back to the deactivated engine-cylinder 16, internal residual management via cam phasing, and improved deactivation robustness by preventing the opening of an intake-engine-valve 12 into a positively pressured engine-cylinder 16.

While this invention has been described in terms of the preferred embodiments thereof, it is not intended to be so limited, but rather only to the extent set forth in the claims that follow.

We claim:

1. A cylinder-deactivation system for an internal combustion engine used to disable an activation of an engine-valve, said system comprising:
an intake cam-follower-assembly which opens an intake-engine-valve, said intake cam-follower-assembly switchable to operate in one of an active-state that opens the intake-engine-valve and defines an active-combustion-cycle, and a deactive-state that prevents the opening of the intake-engine-valve and defines a deactive-combustion-cycle;
an exhaust cam-follower-assembly which opens an exhaust-engine-valve, said exhaust cam-follower-assembly switchable to operate in one of a primary-lift-state, and a secondary-lift-state;
an exhaust-cam which includes a primary-lift cam-lobe and a secondary-lift cam-lobe in rotational contact with the exhaust cam-follower-assembly, said primary-lift cam-lobe positioned to actuate the exhaust cam-follower-assembly in the primary-lift-state, and said secondary-lift cam-lobe positioned to actuate the exhaust cam-follower-assembly in the secondary-lift-state; and
a controller in communication with the intake cam-follower-assembly and the exhaust cam-follower-assembly, said controller programmed to select the deactive-state, said controller further programmed to select the secondary-lift-state such that the exhaust-engine-valve is opened with the secondary-lift cam-lobe during an exhaust-blow-down period of the deactive-combustion-cycle in advance of the opening of the intake-engine-valve that occurs during a subsequent active-combustion-cycle.

2. The system in accordance with claim 1, wherein the exhaust-engine-valve and the intake-engine-valve are located in a same engine-cylinder.

3. The system in accordance with claim 2, wherein the secondary-lift cam-lobe opens the exhaust-engine-valve within ten degrees of a crankshaft-revolution before the opening of the intake-engine-valve.

4. The system in accordance with claim 3, wherein the exhaust-engine-valve is open for greater than sixty degrees of the crankshaft-revolution and open for less than one-hundred degrees of the crankshaft-revolution.

5. The system in accordance with claim 2, wherein the secondary-lift cam-lobe opens the exhaust-engine-valve when a position of a cylinder-piston in an engine-cylinder is within 5° of a crankshaft-revolution before top-dead-center and within 5° of the crankshaft-revolution after top-dead-center.

6. The system in accordance with claim 5, wherein the exhaust-engine-valve is open for greater than three-hundred-sixty degrees of the crankshaft-revolution.

7. The system in accordance with claim 2, wherein the selection by the controller of the deactive-state and the selection of the secondary-lift-state occur simultaneously.

8. The system in accordance with claim 7, wherein the secondary-lift cam-lobe opens the exhaust-engine-valve within ten degrees of a crankshaft-revolution before the opening of the intake-engine-valve.

9. The system in accordance with claim 8, wherein the exhaust-engine-valve is open for greater than sixty degrees of the crankshaft-revolution and open for less than one-hundred degrees of the crankshaft-revolution.

10. The system in accordance with claim 7, wherein the secondary-lift cam-lobe opens the exhaust-engine-valve when a position of a cylinder-piston in an engine-cylinder is within 5° of a crankshaft-revolution before top-dead-center and within 5° of the crankshaft-revolution after top-dead-center.

11. The system in accordance with claim 10, wherein the exhaust-engine-valve is open for greater than three-hundred-sixty degrees of the crankshaft-revolution.

12. A method for controlling a cylinder-deactivation system including an intake cam-follower-assembly which opens an intake-engine-valve, said intake cam-followerassembly switchable to operate in one of an active-state that opens the intake-engine-valve and defines an active-combustion-cycle, and a deactive-state that prevents the opening of the intake-engine-valve and defines a deactive-combustion-cycle, an exhaust cam-follower-assembly which opens an exhaust-engine-valve, said exhaust cam-follower-assembly switchable to operate in one of a primary-lift-state, and a secondary-lift-state, an exhaust-cam which includes a primary-lift cam-lobe and a secondary-lift cam-lobe in rotational contact with the exhaust cam-follower-assembly, said primary-lift cam-lobe positioned to actuate the exhaust cam-follower-assembly in the primary-lift-state, and said secondary-lift cam-lobe positioned to actuate the exhaust cam-follower-assembly in the secondary-lift-state, and a controller in communication with the intake cam-follower-assembly and the exhaust cam-follower-assembly, said controller programmed to select the deactive-state, said controller further programmed to select the secondary-lift-state, said method comprising;

selecting the deactive-state;

selecting the secondary-lift-state; and opening the exhaust-engine-valve with the secondary-lift cam-lobe during an exhaust-blow-down period of the deactive-combustion-cycle in advance of the opening of the intake-engine-valve that occurs during a subsequent active-combustion-cycle.

13. The method in accordance with claim 12, wherein the exhaust-engine-valve and the intake-engine-valve are located in a same engine-cylinder.

14. The method in accordance with claim 13, further comprising opening the exhaust-engine-valve with the secondary-lift cam-lobe within ten degrees of a crankshaft-revolution before the opening of the intake-engine-valve.

15. The method in accordance with claim 14, further comprising opening the exhaust-engine-valve for greater than sixty degrees of the crankshaft-revolution and for less than one-hundred degrees of the crankshaft-revolution.

16. The method in accordance with claim 13, further comprising opening the exhaust-engine-valve with the secondary-lift cam-lobe when a position of a cylinder-piston in an engine-cylinder is within 5° of a crankshaft-revolution before top-dead-center and within 5° of the crankshaft-revolution after top-dead-center.

17. The method in accordance with claim 16, further comprising opening the exhaust-engine-valve for greater than three-hundred-sixty degrees of the crankshaft-revolution.

18. The method in accordance with claim 13, further comprising selecting by the controller the deactive-state, and selecting by the controller the secondary-lift-state occur simultaneously.

19. The method in accordance with claim 18, further comprising opening the exhaust-engine-valve with the secondary-lift cam-lobe within ten degrees of a crankshaft-revolution before the opening of the intake-engine-valve.

20. The method in accordance with claim 19, further comprising opening the exhaust-engine-valve for greater than sixty degrees of the crankshaft-revolution and for less than one-hundred degrees of the crankshaft-revolution.

21. The method in accordance with claim 18, further comprising opening the exhaust-engine-valve with the secondary-lift cam-lobe when a position of a cylinder-piston in an exhaust-cylinder is within 5° of a crankshaft-revolution before top-dead-center and within 5° of the crankshaft-revolution after top-dead-center.

22. The method in accordance with claim 21, further comprising opening the exhaust-engine-valve for greater than three-hundred-sixty degrees of the crankshaft-revolution.

* * * * *